United States Patent [19]

Good

[11] 3,917,303
[45] Nov. 4, 1975

[54] COMBINATION GOLF CART AND SEAT

[76] Inventor: Milton W. Good, 147-37 Ash Ave., Flushing, N.Y. 11355

[22] Filed: Sept. 10, 1974

[21] Appl. No.: 504,821

Related U.S. Application Data

[63] Continuation-in-part of Ser. No. 383,493, July 30, 1973, abandoned, which is a continuation-in-part of Ser. No. 194,871, Nov. 2, 1971, Pat. No. 3,762,737.

[52] U.S. Cl. .......................... 280/36 C; 280/DIG. 6
[51] Int. Cl.² .......................................... B62D 1/18
[58] Field of Search ............. 280/36 C, 36 R, 41 C, DIG. 6; 297/16

[56] References Cited
UNITED STATES PATENTS

| | | | |
|---|---|---|---|
| 2,438,078 | 3/1948 | Sutphen | 280/36 C |
| 3,291,502 | 12/1966 | England | 280/41 C |
| 3,403,922 | 10/1968 | Francis | 280/36 C |
| 3,479,052 | 11/1969 | Spielman | 280/41 C |

*Primary Examiner*—Robert R. Song
*Attorney, Agent, or Firm*—Robert E. Burns; Emmanuel J. Lobato; Bruce L. Adams

[57] ABSTRACT

Foldable golf cart has a U-shaped frame comprising an upper transverse portion and a pair of opposite front legs. A stool-height seat is provided on the transverse portion of the frame. A pair of wheels are rotatable on an axle located forwardly of the front legs and above the lower ends of the front legs. A rear leg has its upper end pivotally connected with the frame. A handle for pulling the golf cart is swingable attached to the upper part of the frame at one side thereof. A lower support which extends rearwardly from the axle is provided with a plurality of compartments or pockets for receiving the heads of golf clubs. An upper support which extends rearwardly from an upper portion of the frame comprises a reinforced sheet of flexible material having holes spaced from its edge to receive the shafts of the golf clubs and slits connecting the holes with the edge of the sheet so that the shafts of the golf clubs can be snapped in and out of the holes.

15 Claims, 11 Drawing Figures

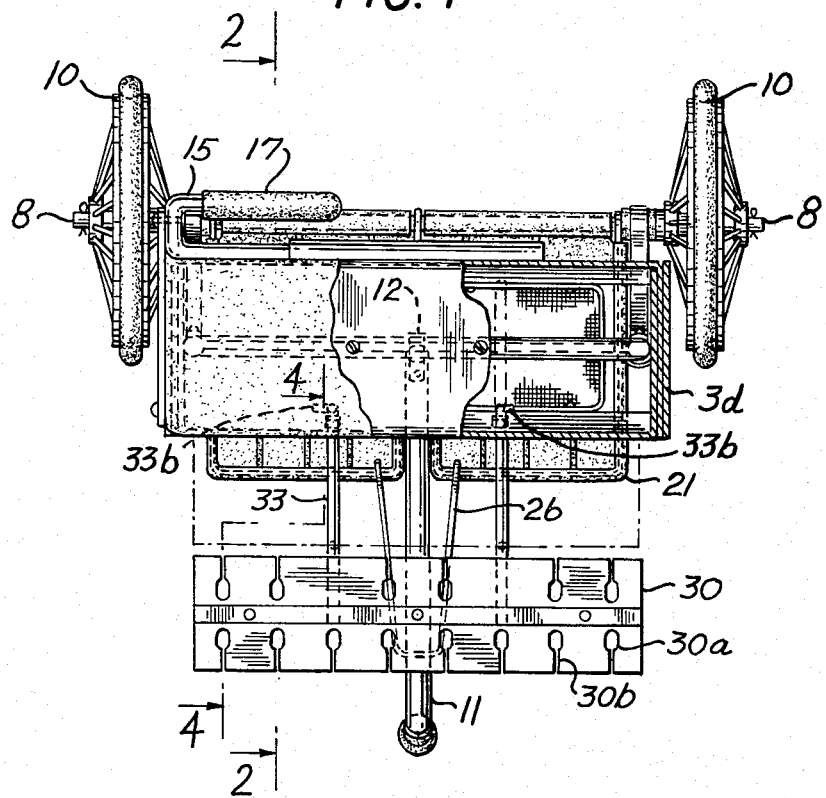
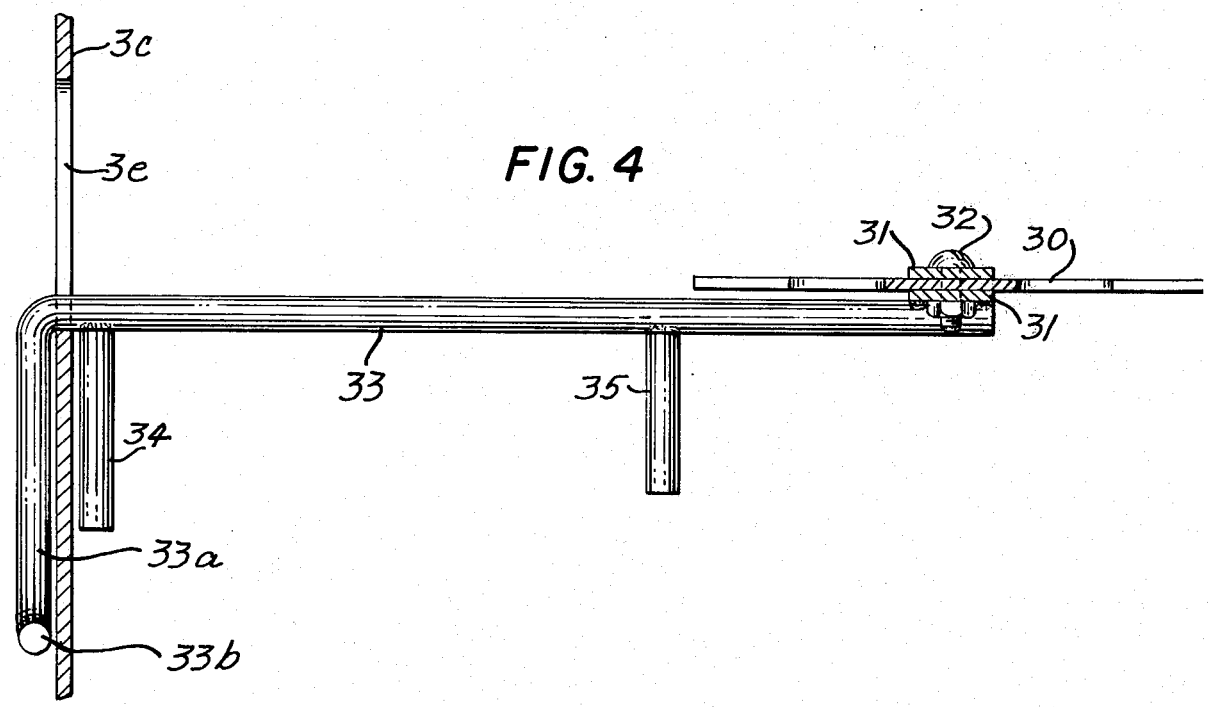

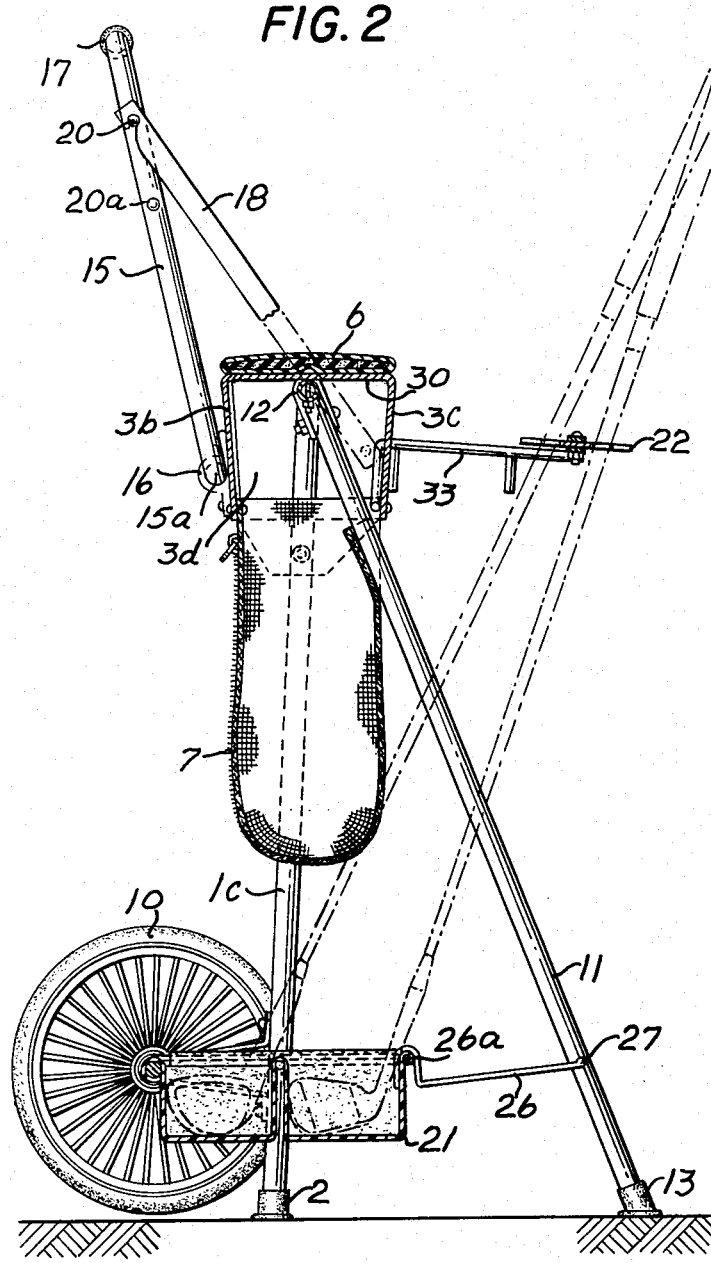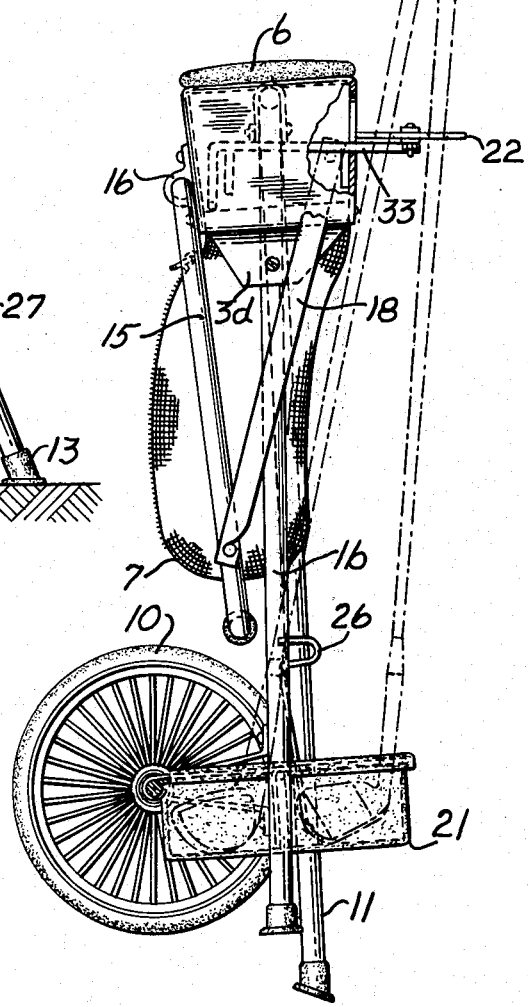

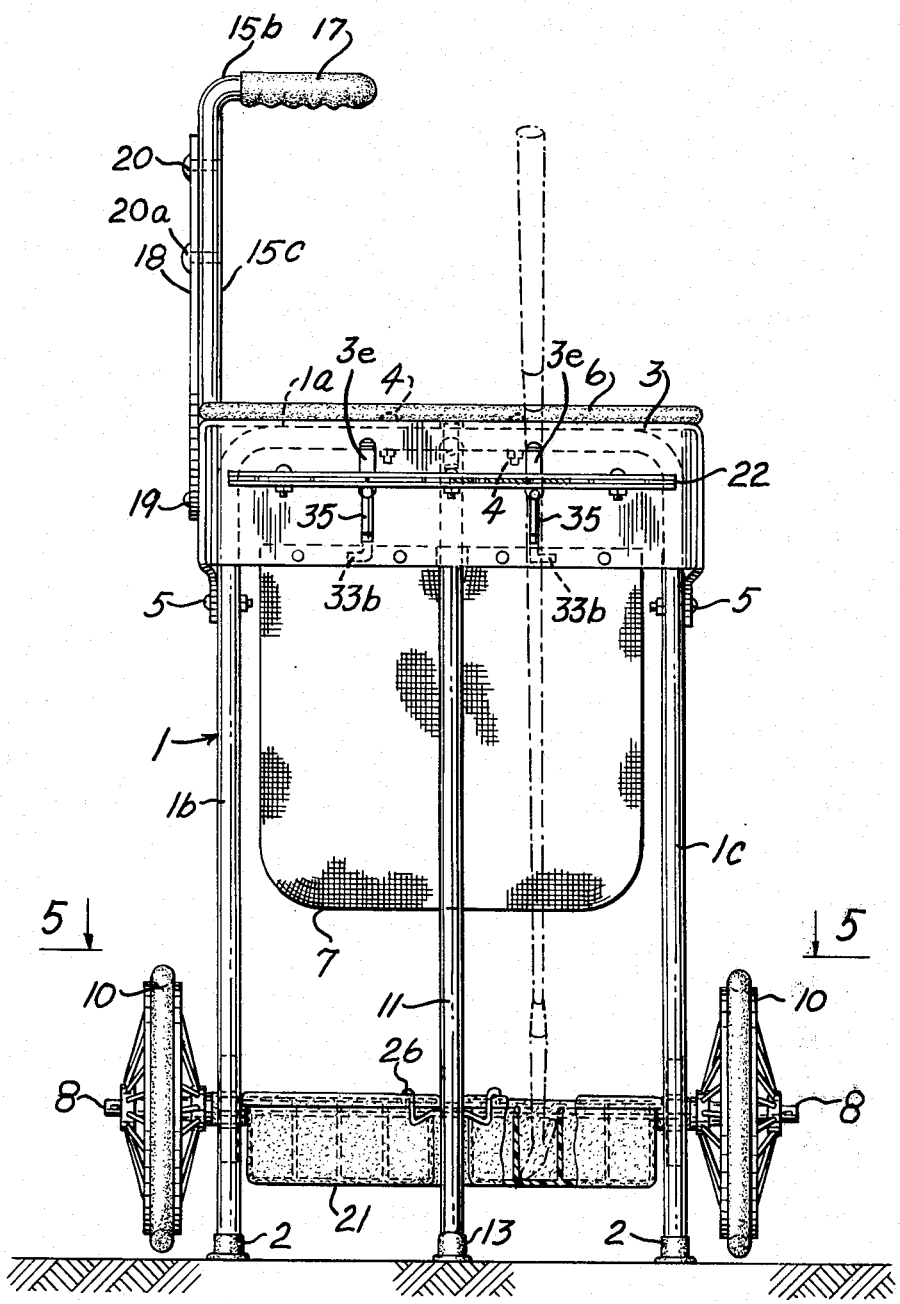

COMBINATION GOLF CART AND SEAT

This application is a continuation-in-part of my copending application Ser. No. 383,493 now abandoned, filed July 30, 1973 which is a continuation-in-part of my application Ser. No. 194,871 filed Nov. 2, 1971, now U.S. Pat. No. 3,762,737.

The present invention relates to a combination cart and seat which is particularly suitable for use by golfers to carry their golf clubs and to provide a seat for resting while waiting on the golf course.

Public golf courses and even the golf courses of private clubs have become so crowded particularly on weekends and holidays that it is frequently necessary for players to wait at each hole or even between successive strokes before they can proceed. Standing around while waiting for the preceding players to play ahead is very tiring, even more so than walking. The result is that a round of golf has become quite fatiguing.

Combination type carts and seats for use by golfers have therefore been proposed but have not gained popularity. This appears to be explained by the fact that they are not convenient to use. Some have low, chair height seats so that the effort of sitting down and getting up many times during a game is more tiring than standing up. With some it is necessary to walk around the cart from one side to the other when it is desired to sit down. Some have not been foldable for transportation of storage or have been foldable only with difficulty. For these and other reasons combination carts and seats have not come into wide use by golfers.

It is an object of the present invention to provide a combination cart and seat which is easily and quickly foldable for transportation and storage, provides convenient means for carrying golf clubs and provides a seat which is comfortable and is convenient to use. The cart is provided with a handle by which it can easily be pulled. When a user of the cart desires to rest he merely sits down on the seat without walking around the cart and without even turning around. Moreover, the seat is sufficiently high that a user can sit on it and take his weight off of his feet with only a slight bending of the knees so that he avoids the effort of sitting on a low seat and getting up again. By reason of its simple and lightweight construction the combination cart and seat in accordance with the invention is inexpensive to manufacture and is durable to use.

Moreover, in accordance with the present invention a lower support for receiving the heads of golf carts and an upper support for receiving the shafts are so arranged that the cart can be folded and collapsed sufficiently to be conveniently carried in the trunk of a car with the golf clubs still in place. It is therefore unnecessary to remove the clubs from the cart when the cart is collapsed for transportation. However, when the clubs are removed, the cart can be collapsed to still smaller dimensions. The upper support is preferably made of resilient sheet material provided with holes of a size to receive golf club shafts spaced inwardly from edges of the sheet and connected to the respective edges by slits which are narrower than the shafts so that individual golf clubs can be placed in the cart merely by putting the head of the club into the respective compartment of the lower support and swinging the shaft toward the upper support so as to pass through the corresponding slit and into the respective hole.

In one embodiment of the invention an axle carrying transport wheels, a movable rear leg and the lower club support are interconnected so that all move to operative position or stored position simultaneously.

The objects and advantages of the invention will be more fully understood from the following description of a preferred embodiment shown by way of example in the accompanying drawings in which:

FIG. 1 is a top view partially in section of a golf cart in accordance with the present invention;

FIG. 2 is a side view of the cart with two clubs shown in broken lines;

FIG. 3 is a rear view of the cart;

FIG. 4 is a detail showing the upper support in section and means for mounting the upper support on the frame;

FIG. 7 is a side view showing the cart in folded and collapsed position with the clubs still in the cart;

Figure 5:
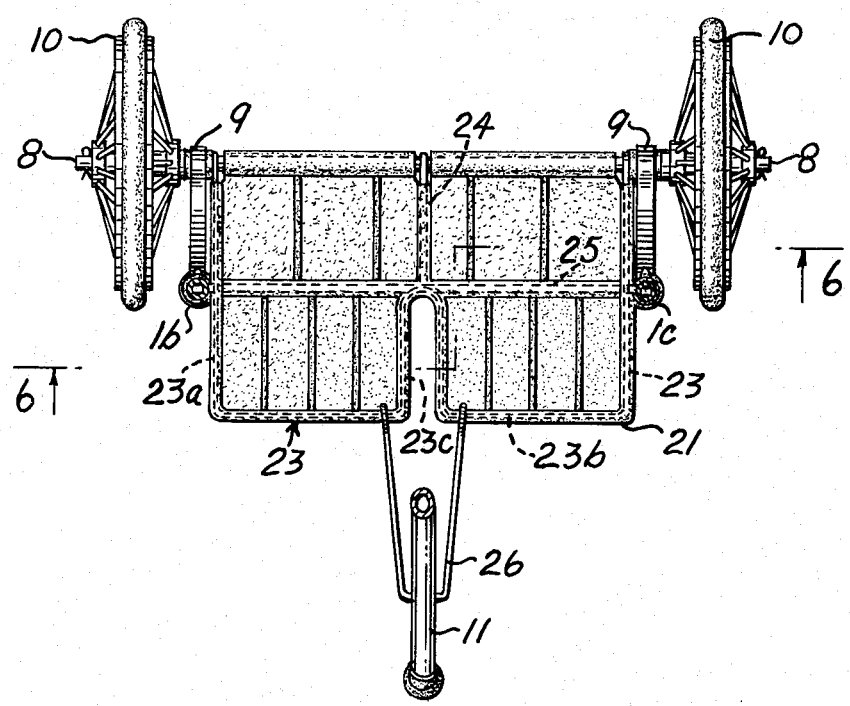
FIG. 5 is a horizontal section taken approximately on the line 5—5 in FIG. 3.
Figure 6:
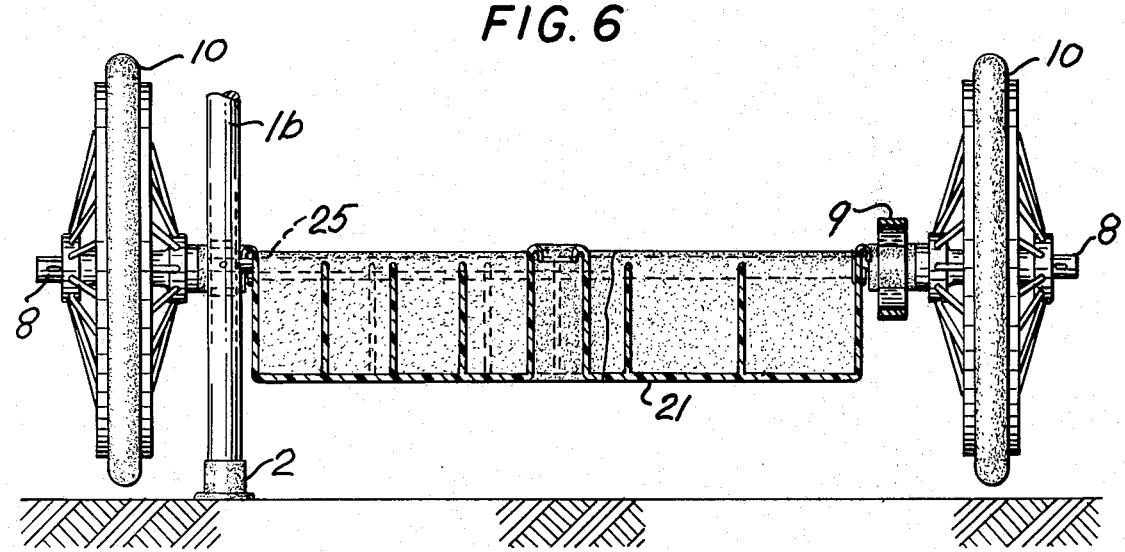
FIG. 6 is a vertical section taken approximately on the line 6—6 in FIG. 5.

The golf cart shown by way of example in FIGS. 1 to 7 of the drawings has a U-shaped frame 1 formed for example of aluminum tubing bent to provide a horizontal transverse portion 1a and downwardly extending front leg portions 1b and 1c. Rubber feet or tips 2 are provided on the lower ends of the legs. A transversely extending bench-like seat 3 is supported by the transverse portion 1a of the frame. The seat is shown as being formed of sheet metal bent to provide a box-like configuration with a top portion 3a, a front side portion 3b, a rear side portion 3c and end portions 3d. The seat is secured to the frame for example by bolts 4 passing through the top portion of the seat and the transverse portion of the frame and by bolts 5 passing through end portions of the seat and the legs of the frame. As thus assembled, the seat 3 and frame 1 comprise a unitary structure so that for the purposes of mounting pertinent components, the seat 3 may be considered as a part of the frame. A cushion or padding 6 is preferably provided on the top of the seat to make it more comfortable. It will be seen that the seat extends the full width of the frame. It may, for example have a length of about 16 to 18 inches and a width of about 5 to 6 inches. The seat is of such height that a golfer can rest on it and take his weight off of his feet with only slight bending of the knees. For men of average stature the height of the seat may be about 30 inches from the ground while for children and women it may be somewhat lower, for example about 26 inches. A fabric bag 7 is shown suspended from the seat for carrying various articles. For example, it may have zipper pockets for carrying golf balls and a larger pocket or container for carrying other articles, for example a sweater or jacket.

An axle 8 is mounted fowardly of the lower portions of the front legs 1b and 1c by means of U-shaped brackets 9. Wheels 10 are rotatably supported on opposite ends of the axle 7 and are preferably retained on the axle by spring snap fasteners so that they can readily be removed. As seen in FIG. 2, the axle 8 is located forwardly of the legs and also upwardly above the lower ends of the legs a distance slightly greater than the radius of the wheels. When the cart is in a vertical position as shown in FIG. 2, the wheels are raised off of the ground so that the cart is supported by the legs. When the cart is tipped forwardly (toward the left as seen in FIG. 2) the wheels come into engagement with the ground and the legs are lifted off of the ground so that the cart can roll forwardly on the wheels.

A rear leg 11 is pivotally connected at its upper end to the central portion of the transverse portion 1a of the frame by a U-shape fitting 12 so as to be swingable between an operative position as shown in FIG. 2 and a folded position as seen in FIG. 7. It will be seen that when in operative position the rear leg 11 extends downwardly and rearwardly from the upper portion of the frame so that the front legs 1b and 1c together with the rear leg 11 form a tripod supporting the seat 3. In folded position the rear leg 11 is approximately parallel to and lies between the front legs 1b and 1c. A rubber tip 13 is shown provided at the lower end of the rear leg.

A foldable handle is provided for pulling the cart. The handle 15 is shown as being formed for example of aluminum tubing which is bent to form a first horizontal portion 15a which is rotatably mounted on the front side of the seat by brackets 16, a second horizontal portion 15b fitted with a hand grip 17 and a connecting portion 15c. It will be seen that the connecting portion 15c is located at one end of the seat and that the hand grip portion 15b extends inwardly a short distance to provide a firm grip without obstructing access to the seat. The handle 15 is swingable between an operative position shown in FIG. 2 and a folded position as shown in FIG. 7. In operative position the handle extends upwardly and forwardly from the seat. In folded position the handle extends downwardly from the seat and lies approximately parallel to the legs 1b and 1c. The handle is releasably held in each of the positions by a brace 18 one end of which is pivotally connected to one end of the seat at 19. The other end of the brace is formed with means for releasably securing it to the connecting portion 15c of the handle. For example, the free end of the brace is provided with a notch engageable with a pin 20 provided on the handle. One or more additional pins 20a may be provided on the handle so that the position of the handle can be adjusted as desired. It will be seen that the brace 18 holds the handle securely both in the operative position as shown in FIG. 2 and also in the folded position as shown in FIG. 7.

The cart is provided with means for carrying individual golf clubs without a bag. The club carrying means is shown as comprising a lower support 21 for the heads of the clubs and an upper support 22 for holding the shafts of the clubs, two of which are shown in broken lines in FIGS. 2 and 7. The lower club support 21 is shown as comprising an approximately rectangular tray extending rearwardly from the axle 8 which supports the front edge of the tray. The tray is further supported and reinforced by a heavy wire or rod 23 which is bent in U-shape to provide side portions 23a extending rearwardly from the axle 8 and a transverse portion 23b at the rear edge of the tray. At its center, the transverse portion 23b is bent inwardly as indicated at 23c to conform with a central recess provided in the rear of the tray to accommodate the rear leg 21 when folded inwardly as illustrated in FIG. 7. A further rod or wire 24 is welded to and extends forwardly from the inwardly bent portion 23c to the axle 8. The tray is swingable about the axis of the axle between an operative position in which the tray is approximately horizontal as seen in FIG. 2 and a folded position in which it extends upwardly from the axle and lies between the front legs 1b and 1c. When in operative position, the tray is supported by a transverse rod 25 which extends between the front legs 1b and 1c. The tray is divided by integral partitions into a plurality of compartments of a size and shape to receive the heads of individual golf clubs. As shown by way of example in FIG. 5, there are two rows of compartments comprising a front row having six compartments and a rear row having eight compartments. Between the forward and rearward compartments the bottom of the tray is recessed upwardly as seen in FIG. 2 to accommodate the transverse rod 25 which supports the U-shaped rod 23 when the tray is in operative position. The tray is suitable molded of a high impact plastic material.

Means for holding the rear leg 11 in operative position is shown as comprising a U-shaped bracket 26 suitably formed of stiff wire. The bracket 26 is pivotally connected to the rear leg 11 at 27, for example by passing through a transverse hole in the leg. The free ends of opposite arms of the bracket are provided with downwardly opening hook portions 26a adapted to engage over the rear edge of the tray 21, reinforced by the transverse portion of the rod 23. By reason of the reinforcement provided by the rod 24, a strong support is provided for the bracket 26.

As illustrated by way of example in the drawings, the upper support 22 comprises an approximately rectangular sheet 30 of flexible and resilient material for example plastic or fabric reinforced rubber. The sheet 30 is provided with holes 30a which are spaced inwardly from the forward and rearward edges of the sheet and are connected with the respective edges by slots 30b. The holes 30a are of a size to receive the shafts of golf clubs while the slots 30b are narrower than the diameter of the shafts. The flexible sheet 30 is reinforceed and supported by a backbone comprising metal or other strips 31 diposed above and below the sheet 30 and connected by bolts 32. It will be seen that the backbone provided by the strips 31 extends between the rows of holes 30a in the sheet 30. The upper support 22 is mounted rearwardly of the seat 3 by means of bars 33, the rear ends of which are fixed to the backbone of the sheet, for example by being welded to the lower strip 31. At their forward ends, the bars 33 extend through vertical slots 3e provided in the rear side 3c of the seat and are bent to provide downwardly extending portions 33a approximately perpendicular to the main portions of the bars. Lower ends 33b of the portions 33a are bent laterally at right angles to a plane defined by the main portion of the bar 33 and the downwardly extending portion 33a. A branch rod 34 is welded to the bar 33 and extends downwardly and parallel to the portion 33a. The branch rod 34 is spaced from the portion 33a a distance slightly greater than the thickness of the rear side 3c of the seat and is shorter than the portion 33a. A second branch rod 35 extends downwardly from the bar 33 just forwardly of the front edge of the sheet 30.

When the upper support 22 is in operative position, the bars 33 extend rearwardly from the seat and are supported by portions of the rear side 3c of the seat received between the branch rods 34 and the downwardly extending end portions 33a of the bars 33 as illustrated in FIG. 4. In this position the rectangular flexible sheet 30 is approximately horizontal and is spaced rearwardly of the seat of the cart as shown in FIG. 2. With the upper support in this position, clubs can readily be inserted by placing the head in the respective compartment of the lower support and pushing the shaft through one of the slots 30 into the respective hole 30a of the flexible sheet. To move the upper support to retracted position, the upper support 22 is lifted slightly so that the branch rods 34 will pass through the slots 3e and the support is then slid forwardly until the branch rod 35 engages the rear wall of the seat. In this position as illustrated in FIG. 7, the clubs are still retained in the lower and upper supports but shafts of the clubs are nearer the seat. The handle 15 is folded down and the rear leg 11 is folded forwardly so that the cart is collapsed to compact dimensions permitting it to be carried in the trunk of a car.

If it is desired to collapse the cart to still smaller dimensions the clubs are removed from the upper and lower supports. The lower support can then be swung upwardly about the axle 8 to a folded position in which it extends upwardly from the axle and lies between or just in front of the front legs 1b and 1c. The upper support 22 is moved rearwardly from its retracted position until the branch rod 34 engages the inside of the rear side 3c of the seat. The support can then be swung downwardly about the lower edges of the slots 3e as pivots. The laterally bent ends 33b of the downwardly extending portions 33a of the bars 33 prevent the bars from coming out of the slots 3e. Moreover, the wheels 10 can readily be removed from the axle 8 so as to reduce the overall dimensions of the cart still further.

Figures 8, 9:
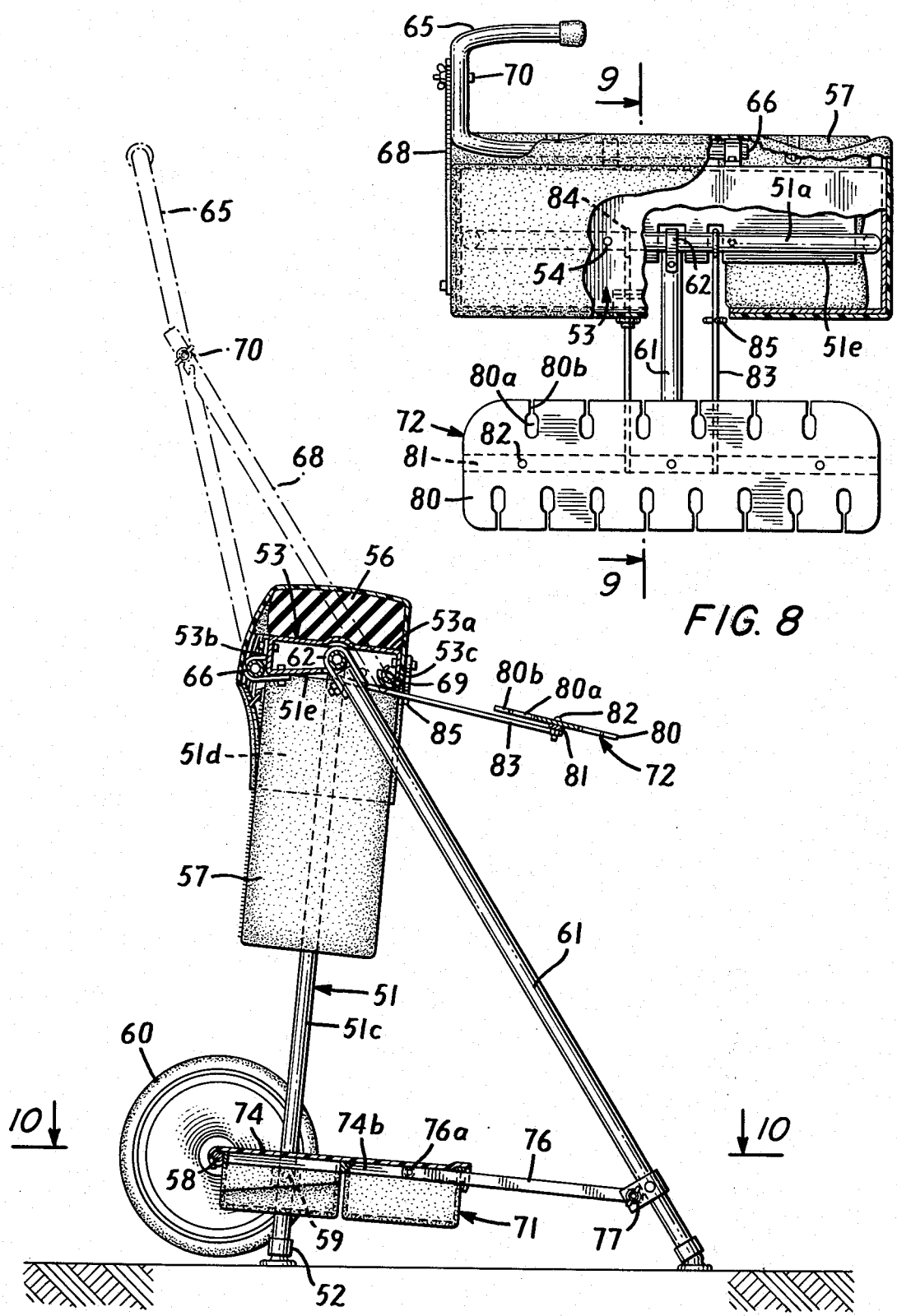
FIG. 8 is a top view partially in section of a second embodiment of a golf cart in accordance with the present invention.
FIG. 9 is a vertical section taken approximately on the line 9—9 in FIG. 8.
Figure 10:
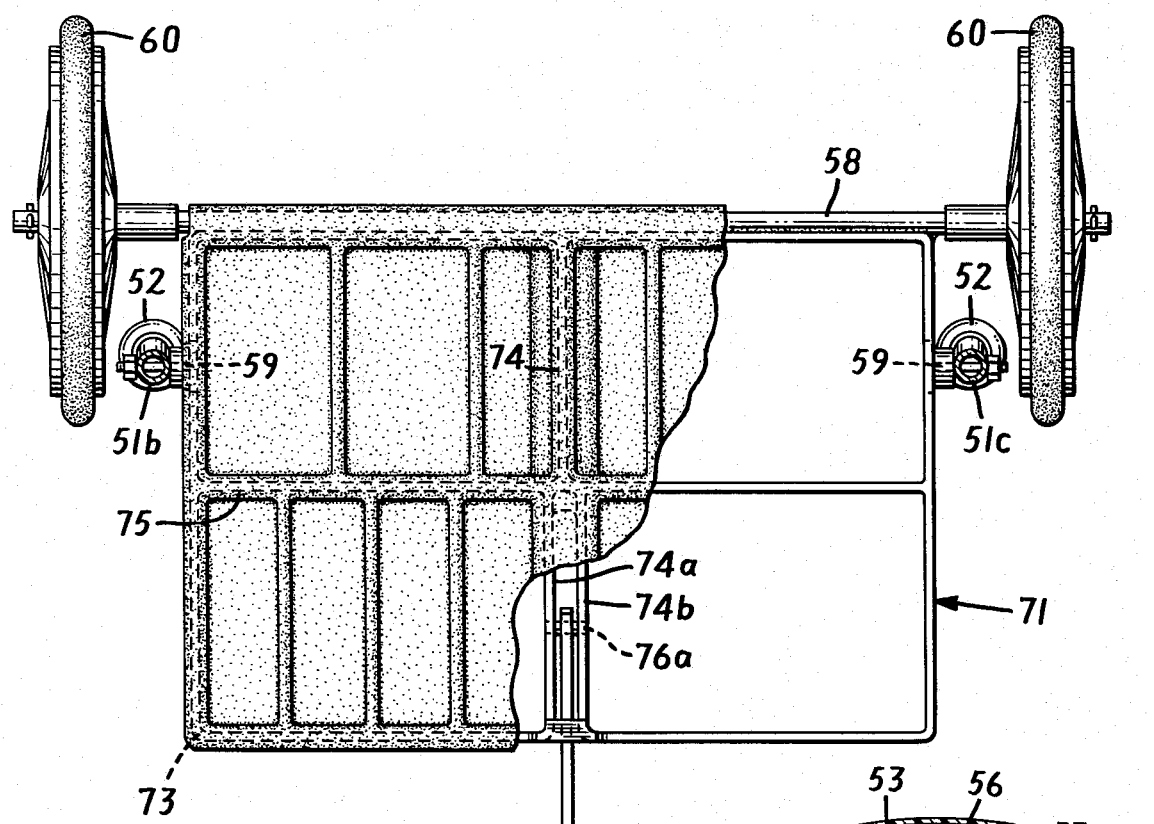
FIG. 10 is a horizontal section taken approximately on the line 10—10 in FIG. 9.
Figure 11:
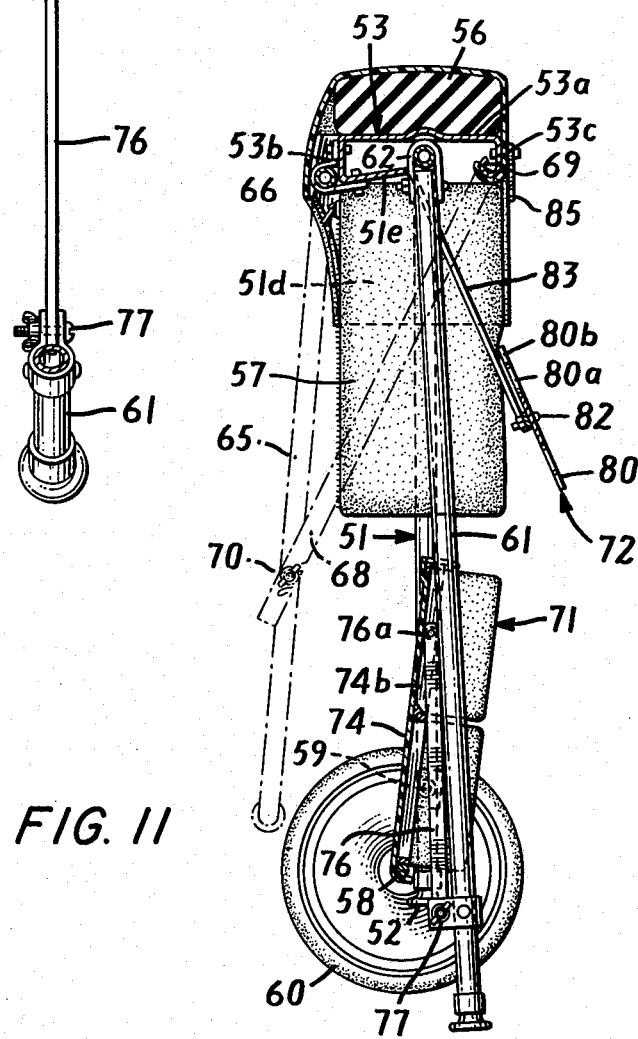
FIG. 11 is a side view partially in section showing the golf cart in folded or collapsed position.

Another embodiment of the invention is illustrated in FIGS. 8 to 11 in which corresponding parts are designated by the same reference numerals as in FIGS. 1 to 7 with the addition of 50. Except for differences that will be pointed out, the embodiment shown in FIGS. 8 to 11 is similar to that shown in FIGS. 1 to 7. A tubular frame 51 is bent to form a horizontal top portion 51a and side legs 51b and 51c. Feet 52 are provided at the bottom of the legs. A seat 53 mounted on the frame and formed for example of sheet metal has a top portion 53a, a front portion 51b, a rear portion 51c and opposite ends 51d. As seen in FIGS. 9 to 11, the front portion 51b of the seat is bent back to form a portion 51e which extends beneath the transverse portion 51a of the frame. The seat is secured to the frame by bolts 54 extending through the top portion 53a of the seat, the transverse portion 51a of the frame and the inwardly bent portion 53e of the seat. Other bolts extend through the downwardly bent end portions 53d of the seat and the legs of the frame. A cushion 56 is provided on the seat and flexible fabric or plastic bags 57 are suspended from the seat and provided with suitable closures for receiving golf balls or other articles.

Wheels 60 are rotatably mounted on opposite ends of a transversely extending axle 58. A central rear leg 61 is pivotally connected with a central portion of the transverse part 51a of the frame by means of a fitting 62 so as to be swingable between an extended position as shown in FIG. 9 and a folded position as shown in FIG. 11. The axle 58 is located in front of the legs 51b and 51c and sufficiently above the lower ends of the legs that when the cart is in the position shown in FIG. 9 it rests on the legs 51b, 51c and 61 and the wheels 60 are raised off of the ground. As in the previously described embodiment, the cart is provided with a handle 65 which is pivotally mounted by means of brackets 66 on the front portion of the seat so as to be swingable from an operative position as shown in FIG. 9 to a folded position as shown in FIG. 11. A brace 68 pivotally mounted to an end portion of the seat at 69 is provided with one or more notches to receive a small bolt 70 provided with a thumb screw whereby the handle 65 can be secured either in operative or in folded position as desired. When the cart is being pulled by means of the handle 65 it tilts forwardly so as to bring wheels 60 into contact with the ground while lifting the seat 52 provided on the side legs and a foot 63 provided on the rear legs off of the ground.

As in the embodiment illustrated in FIGS. 1 to 7 the cart is provided with a lower support 71 having compartments for receiving the heads of individual clubs and an upper support 72 for holding the shafts of the clubs. The lower support 71 is in the form of a rectangular tray having partitions forming compartments for the individual club heads. The tray is conveniently molded of plastic or formed from sheet metal. It is preferably reinforced by a peripheral frame 73, a central reinforcing bar 74 extending in a fore-and-aft direction and a transverse reinforcing bar 75. At least the rearward portion of the central reinforcement 74 is bifurcated to provide spaced portions 74a and 74b to receive a brace 76 for the rear leg 61. The forward end of the brace 76 is pivotally connected between the bars 74a and 74b by a pin 76a while the rear end is pivotally connected to a lower portion of the rear leg 61 by a fitting 77. The lower support 71 is received between the side legs 51b and 51c and is pivotally connected to the legs by pivots 59. It will be seen that the pivots are located approximately one-fourth of the distance from the front to the back of the lower support. The dimensions of the lower support and of the brace 76 and the location of the pivots are selected so that the lower support and rear leg are foldable from the position shown in FIG. 9 to that shown in FIG. 11. When the lower support 71 is in operative position as shown in FIG. 9 the brace 76 holds the rear leg 61 firmly in a rearwardly inclined position so that the rear leg in cooperation with the side legs provides a tripod support for the seat. Moreover, the axle 58 of the wheels 60 is mounted on the front of the lower support 71 so that when the lower support swings to the stored position shown in FIG. 11 the axle 58 carrying the wheels is retracted to a position in which it lies close to the side legs of the frame. The whole assembly is thereby made more compact when in folded position.

The upper support 72 for holding the shafts of the golf clubs is similar to that described with respect to FIGS. 1 to 7 and comprises a flexible sheet 80 provided with individual openings 80a and slots 80b for receiving the shafts of the clubs. The flexible sheet 80 is provided with a transversely extending central backbone 81 formed for example of a strip of metal to which the sheet is secured, for example by bolts or rivets 82. The upper support 72 is mounted on the frame by means of two arms 83 each having one end fixed to the backbone 81 of the support while the other end is pivoted on the transverse portion 51a of the frame as indicated at 84. By means of this pivotal connection the upper support 72 is swingable between an operative position in which it extends rearwardly from the seat as shown in FIG. 9 and a folded position in which it lies against the bag 57 as shown in FIG. 11. Suitable means is provided for releasably securing the upper support 72 in operative position. As shown by way of example, the securing means comprises hooks 85 which are pivotally connected to the rear portion 53c of the seat so as to be capable of hooking under the arms 83 and thereby holding the support in raised position. When it is desired to fold the support down to the position shown in FIG. 11, the hooks 85 are merely swung about their pivots so as to release the arms 83. It will be seen that when the cart is in folded or collapsed position as shown in FIG. 11, it is extremely compact and can readily be accommodated in the trunk of a car along with other luggage.

The operation of the cart shown in FIGS. 8 to 11 is similar to that shown in FIGS. 1 to 7. Starting with the cart in the folded position shown in FIG. 11, the lower support 71 is swung downwardly about its pivot thereby moving the wheel axle forwardly and upwardly and extending the rear leg 61 to the position shown in FIG. 9. The weight of the lower support 71 automatically locks the rear leg 61 in its extended position. The upper support 72 is swung upwardly about its pivotal axis and secured in place by the hooks 85. The handle 65 is swung forwardly and upwardly to the position shown in FIG. 9 and secured in place by the brace 68 and thumb screw on the bolt 70. The cart is then ready for use in the same manner as previously described.

While preferred embodiments of the invention have been illustrated in the drawings and are herein particularly described, it will be understood by those skilled in the art that modifications may be made while still incorporating the invention and that the invention is in no way limited to the illustrated embodiments.

What I claim and desire to secure by Letters Patent is:

1. In a foldable golf cart having a U-shaped frame comprising an upper transverse portion and a pair of opposite front legs extending down from said transverse portion, a seat on said transverse portion, a pair of wheels disposed on an axis forward of said front legs and above the lower ends thereof, a rear leg pivotally connected at its upper end to said frame and swingable from an operative position in which it angles downwardly and rearwardly to a folded position approximately parallel to said front legs, and a handle for pulling said cart, the improvement comprising a lower support pivotally supported between lower portions of said front legs and extending rearwardly of the wheel axis, said lower support having a plurality of compartments for receiving the heads of individual golf clubs, and an upper support movably carried by an upper portion of said frame and having means for individually receiving the shafts of individual golf clubs, said upper support being movable between a rearward operative position in which it projects rearwardly of said frame and a forward retracted position.

2. A golf cart according to claim 1, in which said upper support is slidable forwardly while the shafts of said golf clubs are received in said upper support.

3. A golf cart according to claim 1, in which said upper support is swingable downwardly and forwardly from said operative position in which it projects rearwardly from said frame to a stored position in which it lies adjacent said frame.

4. A golf cart according to claim 1, in which said upper support comprises a sheet of flexible material having holes of a size to receive the shaft of a golf club spaced from an edge thereof and a slit connecting each hole with said edge, said slit being narrower than the diameter of that portion of said shaft to be received in said hole.

5. A golf cart according to claim 4, in which said sheet of flexible material is rectangular with the length direction of said sheet extending transversely of said cart and with said holes and slits disposed in spaced relation to one another along each of the longitudinal edges of said sheet.

6. A golf cart according to claim 5, in which said upper support further comprises a relatively rigid central backbone extending lengthwise of said sheet and reinforcing said sheet.

7. A golf cart according to claim 6, further comprising means connected with said backbone movably connecting said upper support with said frame.

8. A golf cart according to claim 1, in which said lower support has in its rear edge a central recess for receiving said rear leg when swung forwardly from said operative position.

9. A golf cart according to claim 1, comprising means pivotally connected with said rear leg and engageable with said lower support to hold said rear leg in operative position.

10. A golf cart according to claim 1, in which an axle extends between said wheels and said lower support is swingably connected with said axle so as to swing about said axle between an operative position in which it is disposed approximately horizontally and extends rearwardly from said axle to a stored position in which said lower support is approximately vertical and extends upwardly from said axle.

11. In a foldable golf cart having a U-shaped frame comprising an upper transverse portion and a pair of opposite front legs extending down from said transverse portion, a seat on said transverse portion, a pair of wheels on an axle disposed forwardly of said legs and above the lower ends thereof, a rear leg pivotally connected at its upper end to said frame and swingable from an operative position in which it angles downwardly and rearwardly to a folded position approximately parallel to said front legs, and a handle for pulling said cart; the improvement comprising a lower support having a plurality of compartments for receiving the heads of individual golf clubs, an upper support extending rearwardly from an upper portion of said frame and having means for receiving the shafts of said golf clubs, means mounting said lower support between lower portions of said front legs for pivotal movement between an appproximately horizontal operative position and an approximately vertical stored position and means interconnecting said lower support and said rear leg to move said rear leg to folded position when said lower support is moved to stored position and to move said rear leg to operative position when said lower support is moved to operative position.

12. A golf cart according to claim 11, in which said wheel axle is movable between a retracted position in which it lies adjacent lower portions of said front legs and an extended position in which it is spaced forwardly from said front legs and in which said axle is interconnected with said lower support for moving said axle to said retracted position when said lower support is moved to stored position and for moving said axle to said extended position when said lower support is moved to operative position.

13. A golf cart according to claim 12, in which said lower support is pivotally connected to said front legs and said axle is carried by a forward portion of said lower support.

14. A golf cart according to claim 11, in which said lower support comprises a reinforced molded plastic tray having molded therein a plurality of upwardly opening compartments each of a size to receive the head of an individual golf club.

15. A golf cart according to claim 11, in which said connecting means comprises a link pivotally connected at one end to said rear leg and pivotally connected at the opposite end with said lower support.

* * * * *